March 17, 1970  L. J. HARDT ET AL  3,500,868

FLEXIBLE CONDUIT

Filed Aug. 31, 1967

INVENTORS
LOUIS J. HARDT
JAMES M. YOUNG
BY Price and Silverman
their ATTORNEYS

United States Patent Office 3,500,868
Patented Mar. 17, 1970

3,500,868
FLEXIBLE CONDUIT
Louis J. Hardt, Gilmer, Tex., and James M. Young, Pittsburgh, Pa., assignors to Robroy Industries, Verona, Pa., a corporation of Pennsylvania
Filed Aug. 31, 1967, Ser. No. 664,680
Int. Cl. F16l 11/16
U.S. Cl. 138—127                    7 Claims

ABSTRACT OF THE DISCLOSURE

A flexible conduit having a flexible metal tube completely covered by a plastic insulating member. The plastic insulating member is bonded to the exterior of the flexible metal tube adjacent the ends of the tube, but not intermediate the ends. A metal sleeve frictionally engages the interior of the metal tube and extends outwardly therefrom securing a coupling member to the conduit and cooperating with a portion of the insulating member to provide a seal against entry of fluid into the conduit. A method of making a flexible conduit including providing a flexible metal tube, securing an annular compression band over the outer periphery of the tube at each end, placing an adhesive material on the exterior of the band and the exterior of the tube adjacent the ends and simultaneously establishing and bonding a continuous plastic insulating member over the tube exterior.

FIELD OF THE INVENTION

This invention relates generally to flexible conduit and a method of manufacturing the same. More specifically, this invention relates to composite flexible electrical conduit having an internally disposed flexible metal tube.

DESCRIPTION OF THE PRIOR ART

Composite flexible conduit adapted for use with electrical conductors has been previously known to the art. U.S. Patent 2,438,146 discloses a flexible metal conduit having an interiorly disposed metallic hose made from spirally wound metal strip. On the exterior of the hose is a rubber protective jacket and intermediate layers of metallic wire braids are provided. Various types of metals and metallic coatings suitable for use in the interior hose and the braid are presented therein. A similar cable is disclosed in U.S. Patent 1,995,407, wherein a conductor is covered with wrapped insulation which in turn is covered with a rubber material. Metal strip is wound around the rubber covering.

It has also been known to so construct flexible conduit as to secure within the structure one or more portions of a coupling member. These coupling members are conveniently secured to the apparatus to which the electrical conductor is to be operatively connected. In U.S. Patent 2,577,049, a flexible conduit is provided with resiliency through a spring imbedded in a cylindrical rubber core. The rubber core forms the inner portion of the conduit. Braided strips overlie the inner rubber core and an outer rubber layer is provided. A coupler in the form of a threaded nut is secured to the end of the conduit. Attachment to the conduit is effected through outer and inner ferrules which are crimped to the conduit. The inner ferrule has outwardly directed teeth which penetrate into the rubber core. A shoulder on the outer ferrule engages the threaded nut and thereby prevents axial separation of the nut from the conduit assembly.

One of the obvious difficulties with known devices is the need to use a number of plies of various materials in order to obtain desired flexibility, while providing effective electrical insulation. As additional materials are placed on the conduit core to obtain desired properties, frequently there is a resultant loss of flexibility. This is particularly so where the added materials are somewhat lacking in resiliency, such as wire braid, for example. Another problem encountered has been the need to either modify the conduit design or provide elaborate means for securing a coupler member to the conduit. Simple means for facilitating the attachment of couplers Simple means for facilitating the attachment of couplers to the conduit without impairing the conduit structure have not been readily available. In addition, further difficulties have been encountered in efforts to provide a conduit which is effectively sealed against penetration of fluid into the conduit. Fluids entering the conduit can contribute to failure of conduit materials and ultimately interfere with electrical performance of the enclosed conductor. Finally, one additional problem with some known conduit structures is the absence of a suitable means for grounding the conduit, as a result of the lack of an effective electrical path across the conduit materials.

SUMMARY OF THE INVENTION

The present invention eleminates the above discussed problems by providing a conduit which employs a conventional flexible metal tube as a core member and a resilient external insulating material which is bonded to the tube in only certain areas. Securing of a coupler is simply accomplished by means of a single sleeve which is frictionally engaged within the metal tube interior. An effective fluid seal may be obtained by cooperation between a portion of the insulating material and the metal tube and sleeve. The structure provides a continuous electrical path from the conduit interior to the coupler and thereby facilitates the use of a suitable ground connection. A compression band is secured over the peripheral portions of the ends of the tube in order to reinforce the tube end.

The method of securing the insulating material and inserting the sleeve is rapid, economical and adapted for manufacture of conduit avoiding the above discussed problems. The compression bands are placed on the metal tube prior to insertion of the metal sleeve and prior to effecting frictional engagement with the tube interior. These bands serve as reinforcing means during the insertion of the sleeve. The adhesive for bonding the insulating material to the tube is then placed on the tube and the insulating material is provided and bonded prior to the insertion of the sleeve.

It is an object of this invention to provide a flexible conduit having improved resiliency and an effective seal against fluid penetration into the conduit, while retaining simplicity and economy of design.

It is a further object of this invention to provide a flexible conduit which facilitates secure attachment of a coupler member without impairing the structure of the conduit and without employing complex fastening means.

It is an additional object of this invention to provide a conduit having permanently bonded exteriorly disposed, insulating material, while providing for estabilshment of a ground connection with the conduit interior.

It is yet another object of this invention to provide an economical method for the manufacture of flexible conduit having the aforementioned features.

Other objects and advantages of the invention will be understood from the following description of the invention on reference to the illustrations appended hereto.

DISCLOSURE OF THE PREFERRED EMBODIMENTS

Figure 1:
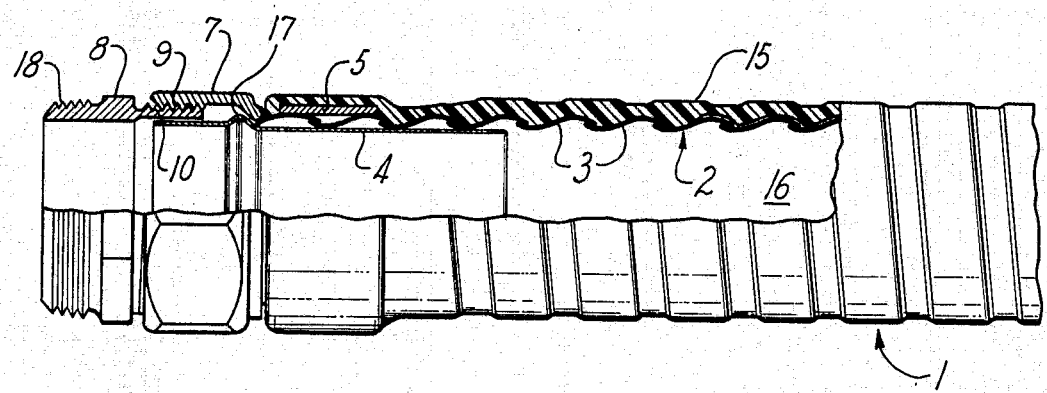
FIGURE 1 is a fragmentary perspective view of a type of flexible conduit contemplated by this invention.

Considering now the drawings in greater detail and more specifically FIGURE 1, the flexible conduit assembly 1 shown therein has an elongate flexible metal tube 2 as the inner member. At the upper end of the metal tube 2 is an annular compression band 5 which is disposed on the exterior of the metal tube 2 and provides reinforcement thereto. On the exterior of the tube 2 is a plastic insulating material member 15 which is preferably continuous and covers substantially all of the continuous band 5 and the exterior surface of the metal tube 2.

Extending into the metal tube 2 is a tubular swaged metal sleeve 4 which frictionally engages the inner surface of metal tube 2. This metal sleeve 4 has an annular enlarged portion 17 disposed exteriorly of, but closely adjacent to, metal tube 2. The metal sleeve 4 passes through a coupler member 7, which in this instance has been illustrated as a gland nut. As the minimum internal diameter of the coupler member 7 is less than the diameter of sleeve 4 at the annular enlarged portion 17 and the sleeve 4 is engaged with metal tube 2, relative axial separation of the sleeve 4 and coupler member 7 is prevented. The coupler 7 is, therefore, effectively secured to the flexible conduit assembly 1. In the form selected for illustration, the upper portion of the coupler member 7 has internally disposed threads 9 which are threadedly engaged with the externally disposed threads 10 of electrical connector 8. Electrical connector 8 also has externally disposed threads 18 which are adapted to be secured to a corresponding member of the particular electrical installation with which it is employed.

The metal tube 2 employed with the flexible conduit assembly 1 of this invention may be any conventional type of flexible tubing, but is preferably of the type made by helically winding metal strip. As is shown in FIGURE 1, each adjacent convolution 3 overlaps and is interlocked with adjacent convolutions 3. As will be further explained hereinafter, this tube structure provides flexibility which is not impaired in the conduit assembly 1 of this invention. Also, as the metal employed is most frequently an economically feasible conductive metal, such as steel, the conductive properties are employed to good advantage in facilitating provision for an electrical ground connection.

Figure 3:
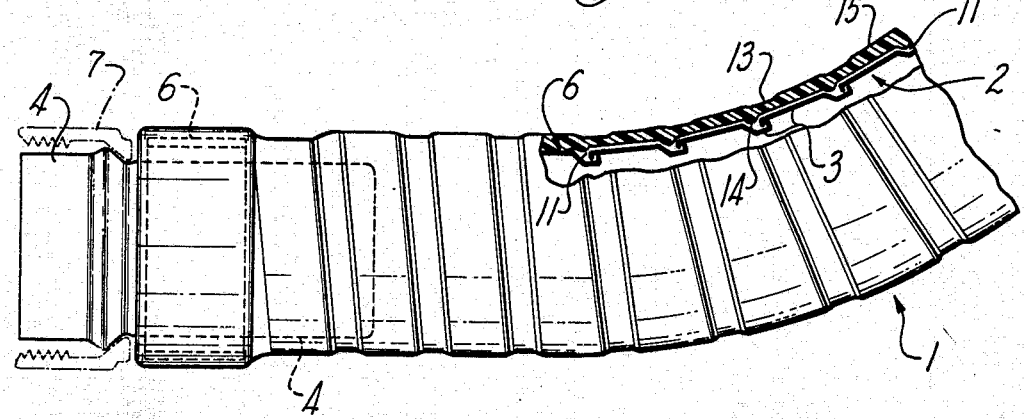
FIGURE 3 is a fragmentary sectional view of a flexible conduit similar to that illustrated in FIGURE 2, but showing the conduit being flexed.

The plastic insulating member 15 is preferably continuous in its coverage of the metal tube 2 and is bonded to the tube 2 by a suitable adhesive (not shown in FIGURE 1). The adhesive bonding is not, however, continuous, but rather is effected adjacent the end portions of the metal tube 2, but not in the intermediate positions, i.e. the central longitudinal portion of the tube 2. This, it is generally preferred that the adhesive bonding extending from each end extend inward no further than about one quarter to one third of the length of tube. In this fashion, flexibility of the conduit 1 is retained. As is shown in FIGURE 3, upon flexure of the tube 2, the plastic member 15 intermediate the ends of the tube 2 is free to separate from the outer surface of tube 2. Upon return of the conduit to unflexed position, the plastic member 15 will return to its initial position. This separation has been indicated generally by reference numeral 11 in FIGURE 3. Thus, if the plastic member 15 were continuously bonded to the tube 2 across the entire tube 2, flexing would be more difficult due to the need to overcome both the compressive and tensile resistances of the member 15 in the central region of tube 2. With there being no adhesive bonding in the area of maximum flexing, the resistance to bending is sufficiently reduced. Also, as there is no multiplicity of layers of materials of varying resiliencies overlying the metal tube 2, the desired flexing properties of the metal tube 2 are retained in the conduit 1. The sole overlying layer, except for the tube compression bands 5, which are located at points of minimum flexing, is the resilient material of member 15.

As has been indicated, the member 15 is composed of a plastic material having electrical insulating properties. The material is also preferably resilient and nonporous to fluids at normal temperatures. It is also preferred, that the material exhibit some resistance to chemical attack and corrosion when exposed to either normal atmosphere or industrial atmosphere. While any material having the above described characteristics would be suitable for use in the member 15, it is preferred to employ a vinyl or ethyl polymer or copolymer such as polyvinyl chloride or polyethylene, for example. Polyvinyl chloride is a preferred material which exhibits superior properties for this purpose and is economical.

The bonding adhesive is generally applied to the areas adjacent the ends of the metal tube 2 to which the plastic insulating member 15 is to be secured. Any suitable adhesive for bonding the plastic material to the metal tube 2 and compression band 5 may be employed. Epoxy or acrylic resins, for example, are suitable, as are other types of thermosetting resins.

Figure 2:
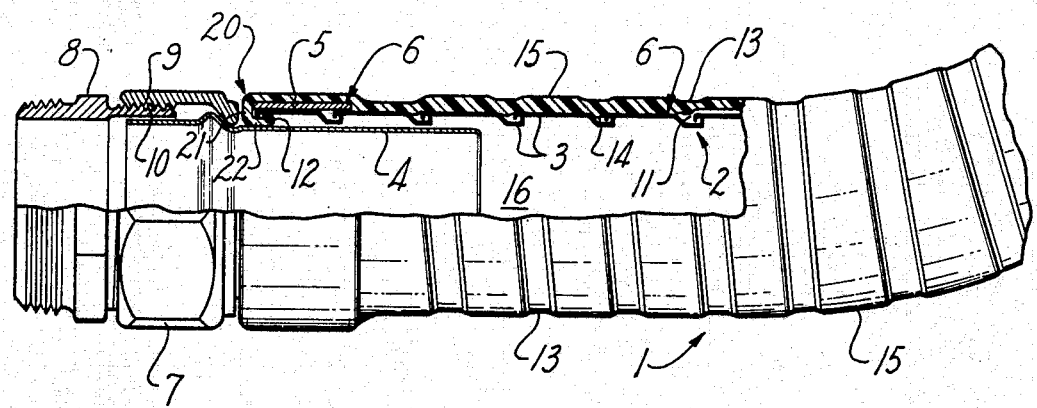
FIGURE 2 is a fragmentary sectional view of a type of flexible conduit having a specific type of seal contemplated by this invention.

Having described the basic structure and materials of the elements and their structural interrelationship, a preferred embodiment as illustrated in FIGURE 2, will be considered in greater detail. The plastic insulating member 15 is secured to metal tube 2 by adhesive 6. The plastic member 15 provides an electrical insulating barrier between tube 2 and the peripheral exterior of conduit assembly 1. Also, member 15 protects metal tube 2 from corrosion and other undesirable chemical effects. The insulting member 15 has an annular re-entrant bend 20 at each end which extends longitudinally outwardly beyond each end of metal tube 2. The annular re-entrant bend 20 has an intermediate bend portion 21 which extends radially inwardly toward swaged metal sleeve 4 and may, if desired, contact sleeve 4. Re-entrant bend 20 also has a terminal bend portion 22 which is contiguous with intermediate bend portion 21 and extends generally longitudinally into the end opening in the metal tube 2. The re-entrant bend 20 may abut sleeve 4 and thereby provide a seal which tends to prevent passage of fluid into the conduit 1 intermediate the inner surface of metal tube 2 and metal sleeve 4. It will be appreciated that fluids entering this region could have detrimental corrosive effect. As the portion of insulating member 15 disposed immediately adjacent the end of metal tube 2 is adhesively secured to tube 2, providing an intermediate bend portion 21 of greater length than the distance between the radially outermost end of the intermediate bend portion 21 and the sleeve 4, will place intermediate bend portion 21 in compression. This will improve the seal at the point of abutment intermediate bend portion 21 with sleeve 4.

FIGURE 2 illustrates another preferred form of seal. The terminal bend portion 22 has a continuous annular enlargement 12 which is of substantially the same breadth or larger than the distance between the interior surface of metal tube 2 and the metal sleeve 4. This enlargement, which is preferably of substantially circular cross-sectional configuration, effectively prevents the entry of fluid into the conduit assembly 1 through the annular space between metal tube 2 and metal sleeve 4. The preferred cross-sectional shape of enlargement 12 is circular and is similar to that of an "O-ring." Also, as the enlargement 12 is integral with plastic member 15 there is a continuous fluid barrier between the portion of member 15 on the exterior of the metal tube 2 and the interiorly disposed enlargement 12. As the insulating material of enlargement 12 is resilient, a certain amount of compression of an enlargement 12 of greater size than the space to be sealed is created. This compression may be provided to improve sealing as a result of the compressive resistance of the material of enlargement 12.

While in FIGURE 2, for clarity of illustration, some of the various components have been illustrated as being separate from and noncontacting other cooperative adjacent elements, it will be obvious that contact is, in fact, made by elements so illustrated. Thus, threads 9, 10 will contact each other and sleeve 4 will contact coupler member 7 and connector 8, as well as metal tube 2.

It will also be appreciated that while an effective fluid seal is provided by cooperation with sleeve 4, the electrical conductivity of the sleeve is not affected and grounding is facilitated. As was indicated above, the swaged sleeve 4 will be in frictional engagement with the metal tube 2. As both the tube 2 and sleeve 4 are electrically conductive members, the conduit assembly 1 is adapted for use as a ground connection. Any current received by the metal tube 2 will be prevented from being conducted radially outwardly through plastic insulating member 15, but will flow along sleeve 4 to a ground wire (not shown) provided at any convenient location and the stray current will be conducted harmlessly away.

The method of this invention contemplates the simple and economical manufacture of an improved flexible conduit. A sector of metal tube 2 to be converted into conduit assembly 1 is provided with an annular compressive band 5 which covers the exterior of the tube 2 at each end of tube 2. A suitable adhesive is placed on the exterior of tube 2 and the surfaces of bands 5 to be bonded to the plastic insulating member 15. The central portions of tube 2 are not bonded to member 15. A continuous plastic insulating member 15 is then established over the tube exterior and simultaneously bonded thereto by means of the previously applied adhesive. After this has been accomplished, a sleeve 4 is urged into each end of tube 2 and into frictional engagement therewith. The compression bands 5 provide reinforcement of the ends of tube 2 and thereby resist impairment of the tube integrity by the radially outwardly directed forces created in tube 2 during insertion of sleeve 4. The sleeve 4, has prior to insertion, been passed partially through the opening in coupler member 7 and the enlarged portion 17 prevents axial separation of the sleeve 4 and coupler member 7.

The preferred form of the method also contemplates integral formation of an annular re-entrant bend 20 at each end of the plastic member 15. The terminal bend portion 22 is preferably made with an enlargement 12.

In a preferred embodiment of this invention, after the compression bands 5 and adhesive 6 have been applied to the metal tube 2, the tube 2 is heated to an elevated temperature and positioned in a conventional fluidized bed of particles of the plastic insulating material such as a polyvinyl chloride. As a result of elevated temperature of the metal tube 2, a uniform coating or jacket of the insulating material is formed on the tube 2. By providing suitably shaped tooling adjacent the ends of tube 2, annular re-entrant bends 20 may be integrally formed with member 15 by deposition of the material, as may the enlargement 12. The tooling should leave exposed solely the exterior of tube 2, the ends of tube 2 and so much of the interior surface of the ends of tube 2 as is desired for formation of terminal bend portion 22 and enlargement 12.

As is illustrated in FIGURE 2, where the preferred method of deposition in a fluidized bed is employed, the recesses 14 in the interior surface of metal tube 2 will receive a portion of the plastic member 15. The plastic member 15 will have a corresponding outer depression 13. While the portion of member 15 penetrating into recess 14 tends to provide sealing against penetration of fluids into the conduit interior through the metal tube, this sealing action is not necessarily relied upon by this invention. As the end portions of the plastic insulating member 15 are adhesively bonded to the outer surface of the metal tube 2, fluids cannot enter the area intermediate the member 15 and tube 2 from the ends. Also, as the member 2 is continuous and nonporous, fluids cannot penetrate directly through the material.

It will be appreciated, that we have provided a flexible conduit and method of manufacture therefor. The conduit assembly possesses improved resiliency, while having structural simplicity. Fluid seals are provided to prevent entry of exterior fluids into the conduit interior. The assembly is adapted for provision of ground connections, as a continuous electrical path is established by the interior conduit members. Effective chemical and corrosion resistance is provided. The assembly also provides secure attachment of couplers and connectors as the integrity of the conduit is not impaired and the attaching means is simple, yet effective. Also, the invention is adapted for economical manufacture, using conventional flexible metal tubes and adapted for use with conventional couplers and connectors.

While a specific form of coupler member 7 and connector 8 have been shown for purposes of illustration, it will be appreciated that numerous forms of coupler members and connectors may be employed. This will frequently vary with the requirements of the particular installation.

Also, while providing member 15 by coating tube 2 with the material has been discussed as a preferred means of establishing member 15, other means such as applying a preformed member 15 may be employed.

Whereas particular embodiments of the invention have been described for purposes of illustrations, it will be apparent to those skilled in the art that numerous variations of the details may be made without departing from the appended claims.

We claim:
1. A flexible conduit comprising, in combination,
an elongate flexible metal tube having end portions and a passageway therethrough,
a tubular continuous plastic insulating member covering the exterior of said metal tube
an annular compression band disposed adjacent each end portion of said metal tube on the exterior of said metal tube and underlying a portion of said tubular insulating member,
said tubular continuous insulating member being adhesively bonded to portions of said metal tube adjacent said metal tube end portions,
said flexible metal tube intermediate said end portions being movable longitudinally relative to said tubular plastic insulating member positioned therearound upon flexing of said flexible metal tube, and
an elongate tubular metal sleeve having a passageway therethrough with an end portion positioned within an end portion of said metal tube and in frictional engagement with the interior of said metal tube,
said metal sleeve having another end portion of enlarged diameter positioned outside of and adjacent to said end portion of said metal tube,
an annular coupling member having a minimum internal diameter smaller than said portion of enlarged diameter of said metal sleeve,
said metal sleeve extending through said coupling member with said coupling member portion of minimum internal diameter positioned between said metal sleeve portion of enlarged diameter and said flexible metal tube end portion whereby said annular coupling member is secured against axial separation from said metal sleeve,
said annular coupling member having an internally threaded end portion axially spaced from said metal tube and radially spaced from said metal sleeve to receive an externally threaded second coupling member.

2. A flexible conduit as set forth in claim 1 wherein, said metal sleeve abuts the inner surface of said flexible metal tube and forms a continuous electrical path from said coupling member through said electrical sleeve to said flexible metal tube.

3. A flexible conduit as set forth in claim 1 in which, said tubular plastic insulating member has annular re-entrant bend portions extending longitudinally over each end of said metal tube into said passageway of said metal tube, each of said annular re-entrant bend portions has an intermediate bend portion extending radially inwardly toward said metal sleeve and a contiguous terminal bend portion extending longitudinally into said passageway in said conduit between said metal sleeve and said metal tube so that said annular re-entrant bend portions cooperate with said metal sleeves and said metal tubes to provide a seal against penetration of fluid into said passageway.

4. A flexible conduit as set forth in claim 3 wherein, said terminal bend portion of said annular re-entrant bend portion has an annular enlargement abutting the interior of said metal tube and the exterior of said metal sleeve to form a seal therebetween.

5. A flexible conduit as set forth in claim 4 wherein, said annular enlargement is of substantially circular cross section.

6. A method of manufacturing a flexible conduit comprising, providing an elongate flexible metal tube having an exterior surface, a passageway therethrough open at opposed ends with an interior surface an annular end portions, securing an annular compression band over said exterior surface of said tube adjacent each end of said tube, applying an adhesive material to the exterior of said band and to said exterior surface of said tube adjacent each end portion of said tube, inserting tools in the opposed ends of said metal tube thereby closing said tube passageway while maintaining said tube exterior surface, said flexible tube annular end portions and portions of said interior surface adjacent said annular end portions exposed, heating said metal tube to an elevated temperature, positioning said heated tube in a fluidized bed of particulate plastic insulating material, forming a continuous plastic insulating member over said tube exterior surface and simultaneously bonding said plastic insulating member to said tube by means of said adhesive material, and said plastic insulating material extending around said annular end portions and into said passageway, said plastic insulating member terminating within said passageway adjacent said annular end portions.

7. The method of claim 6 including, subsequent to forming and bonding said tubular plastic insulating member to said flexible metal tube positioning an annular connector member having an opening therein adjacent said flexible metal tube end portion, positioning an elongate tubular sleeve member in said connector member opening with an enlarged portion of said tubular sleeve preventing further passage therethrough, frictionally engaging said elongate tubular sleeve member to the interior of said metal tube end portion thereby securing said connector member to said metal tube.

References Cited

UNITED STATES PATENTS

| | | | |
|---|---|---|---|
| 2,221,668 | 11/1940 | Bowman | 138—109 XR |
| 2,430,921 | 11/1947 | Edelmann. | |
| 2,550,099 | 4/1951 | Vance | 138—122 |
| 2,898,941 | 8/1959 | Kilcup | 138—122 XR |
| 2,941,571 | 6/1960 | Rothermel | 138—122 XR |
| 3,318,334 | 5/1967 | Fuzzell | 138—109 |
| 3,282,300 | 11/1966 | Kinander | 138—139 |

FOREIGN PATENTS

| | | |
|---|---|---|
| 933,409 | 8/1963 | Great Britain. |
| 1,037,718 | 8/1966 | Great Britain. |

HERBERT F. ROSS, Primary Examiner

U.S. Cl. X.R.

138—139, 141; 264—173